United States Patent
Ghodrat

(10) Patent No.: US 6,535,519 B1
(45) Date of Patent: Mar. 18, 2003

(54) METHOD AND APPARATUS FOR DATA SHARING BETWEEN TWO DIFFERENT BLOCKS IN AN INTEGRATED CIRCUIT

(75) Inventor: Fataneh F. Ghodrat, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/143,086

(22) Filed: Aug. 28, 1998

(51) Int. Cl.[7] .............................................. H04L 12/56
(52) U.S. Cl. ...................... 370/421; 370/535; 710/107
(58) Field of Search ............................ 711/5, 138, 202, 711/159; 712/224, 245; 370/389, 395, 412, 474, 375, 421, 504, 535, 354, 376; 710/107

(56) References Cited

U.S. PATENT DOCUMENTS

| | | | |
|---|---|---|---|
| 3,713,096 A | 1/1973 | Comfort et al. ............ 709/251 |
| 4,193,121 A | 3/1980 | Fedida et al. ............... 711/110 |
| 4,334,305 A | 6/1982 | Girardi ....................... 370/359 |
| 4,641,276 A | 2/1987 | Dunki-Jacobs ............. 710/71 |
| 4,644,535 A | * | 2/1987 | Johnson et al. ............. 370/376 |
| 4,926,416 A | * | 5/1990 | Weik .......................... 370/354 |
| 5,261,056 A | 11/1993 | Lyke .......................... 709/247 |
| 5,398,209 A | 3/1995 | Iwakiri et al. ......... 365/230.03 |
| 5,440,754 A | 8/1995 | Goeppel et al. ............ 713/600 |
| 5,524,107 A | * | 6/1996 | Duggan et al. ............. 370/504 |
| 5,535,366 A | * | 7/1996 | Pfeiffer et al. .............. 711/159 |
| 5,644,609 A | 7/1997 | Bockhaus et al. ............ 377/64 |
| 5,680,600 A | * | 10/1997 | Childers et al. ............ 712/245 |
| 5,781,918 A | * | 7/1998 | Lieberman et al. ........... 711/5 |
| 6,223,277 B1 | * | 4/2001 | Karguth ..................... 712/224 |

* cited by examiner

Primary Examiner—Hassan Kizou
Assistant Examiner—John Pezzlo
(74) Attorney, Agent, or Firm—Carstens, Yee & Cahoon, LLP

(57) ABSTRACT

An integrated circuit that includes an improved architecture that reduces the interface between different blocks by minimizing the wire connections between the two blocks. Specifically, the two blocks are structured to transfer data between the two blocks using only the data bus and a common clock, thus eliminating the need for an address bus. Each block contains data registers used for storing data. The data registers in one block correspond to the registers in the second block, with each block being aware of the memory structure of the other block. When one block needs data from the data registers of the other block, it requests the data and the sending block places the contents of its data registers on the bus sequentially. The requesting block reads the data from the data bus at the appropriate time by counting the number of clock cycles from the time that the data was requested.

21 Claims, 4 Drawing Sheets

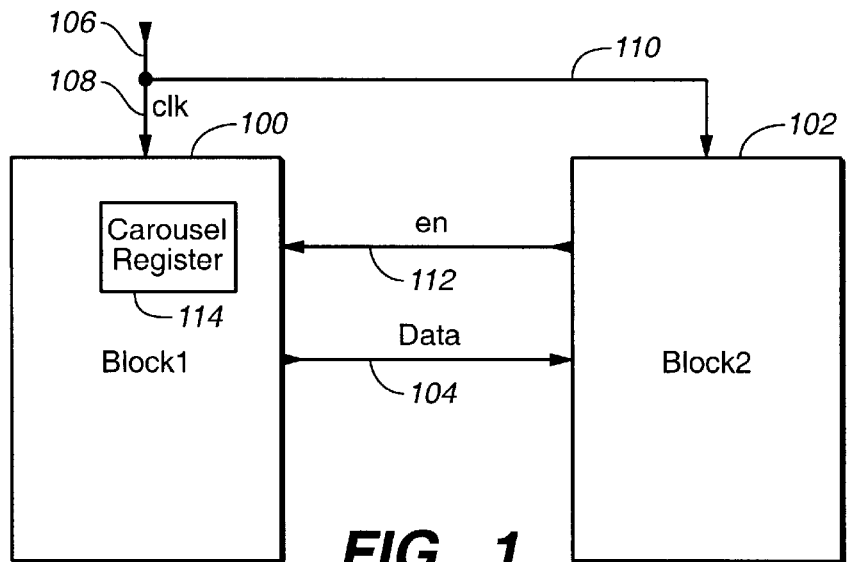
FIG._1
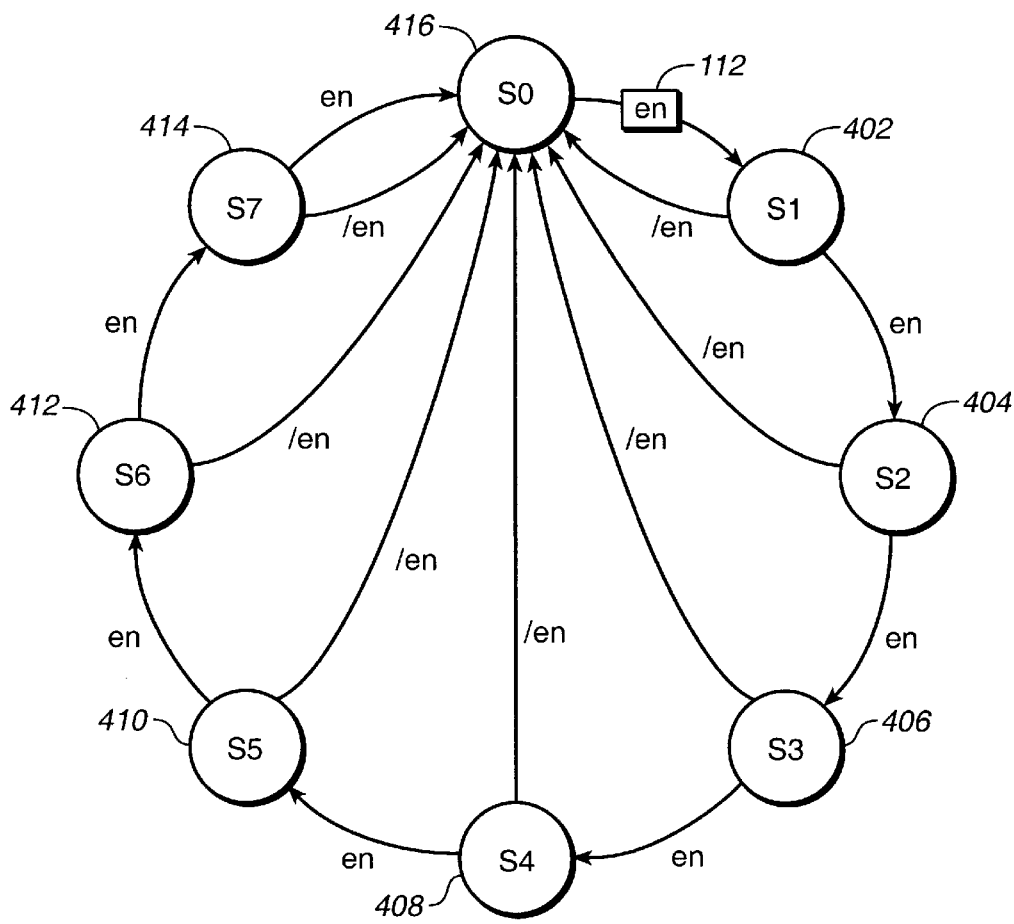
FIG._4

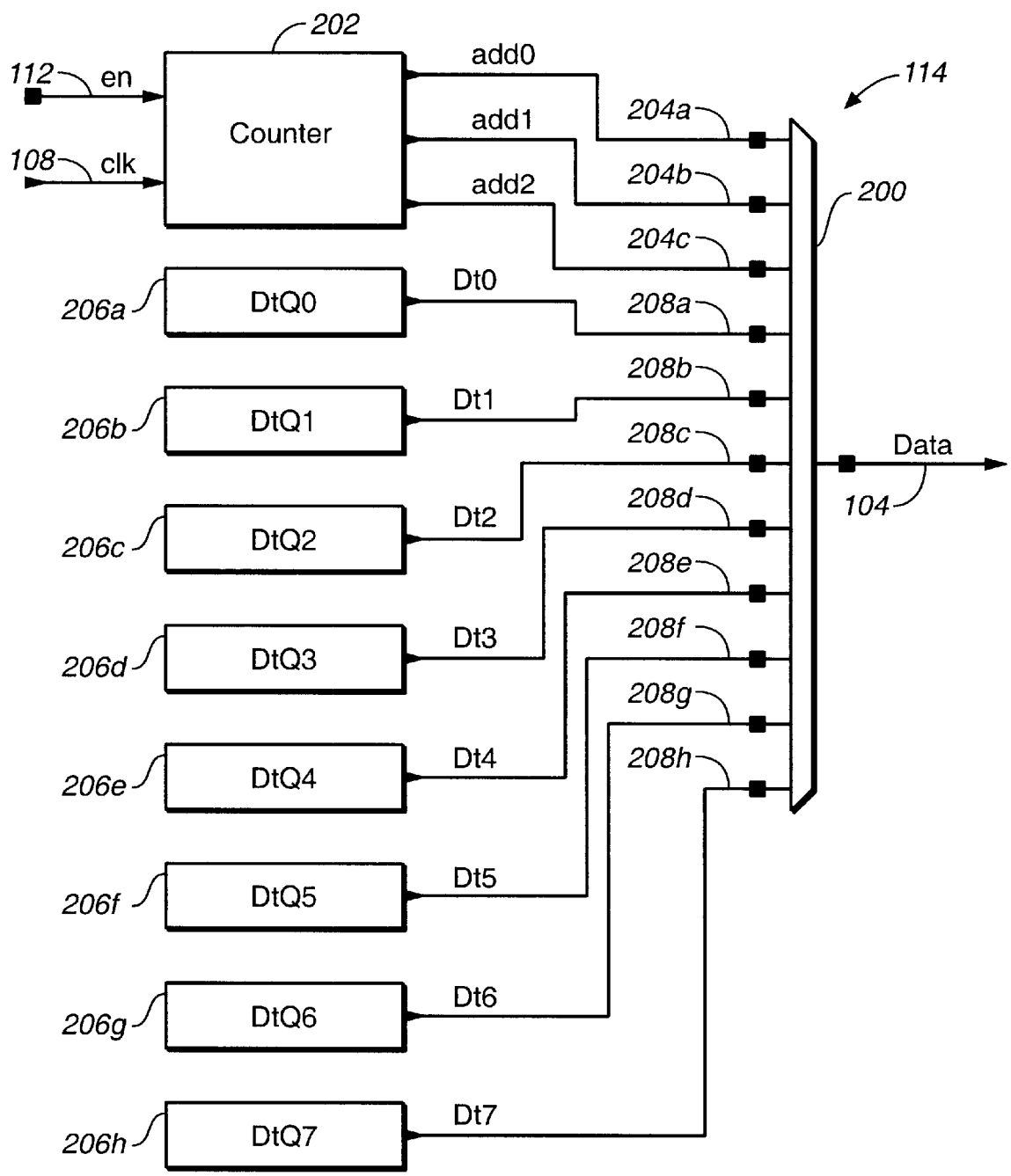
FIG._2

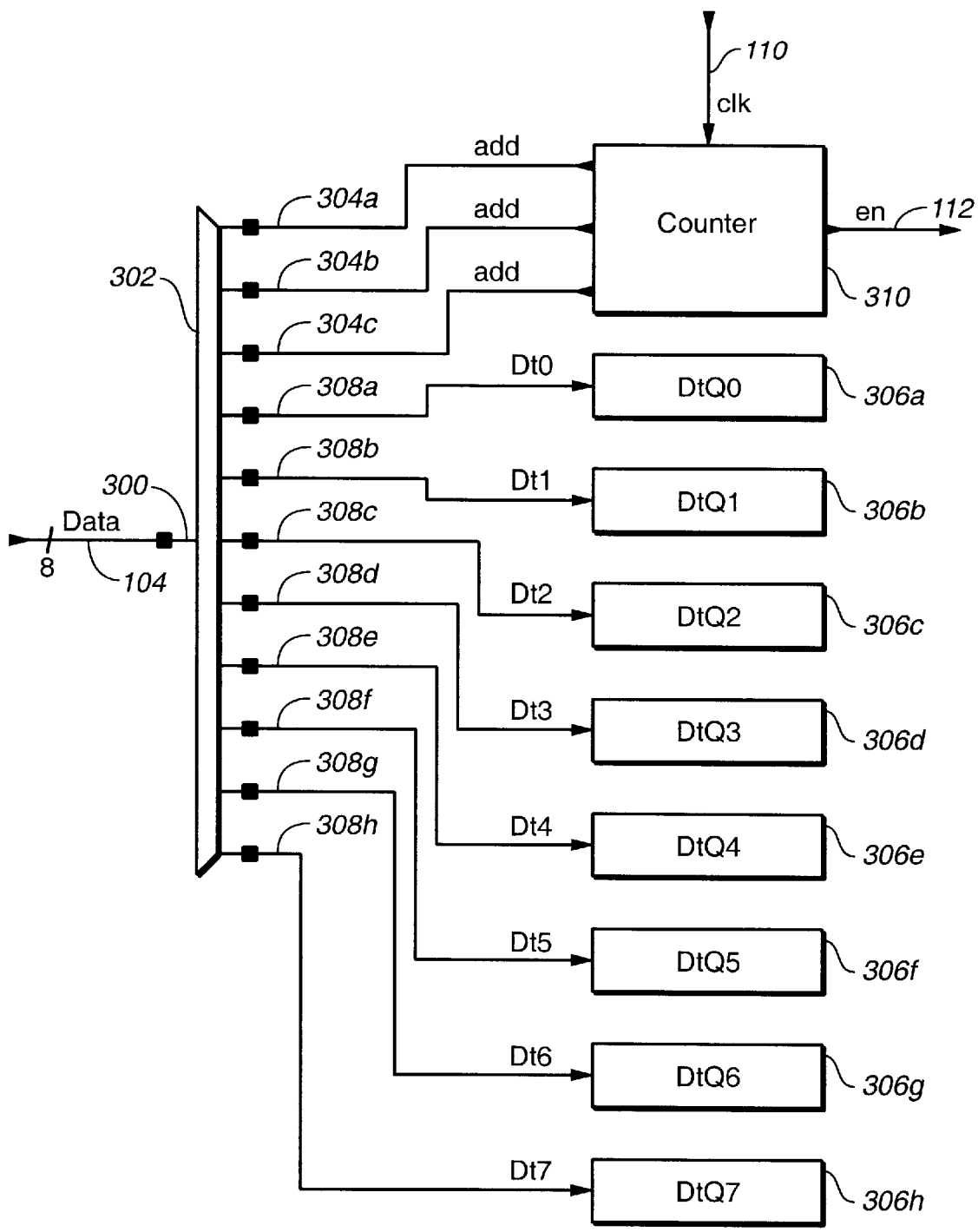
FIG._3

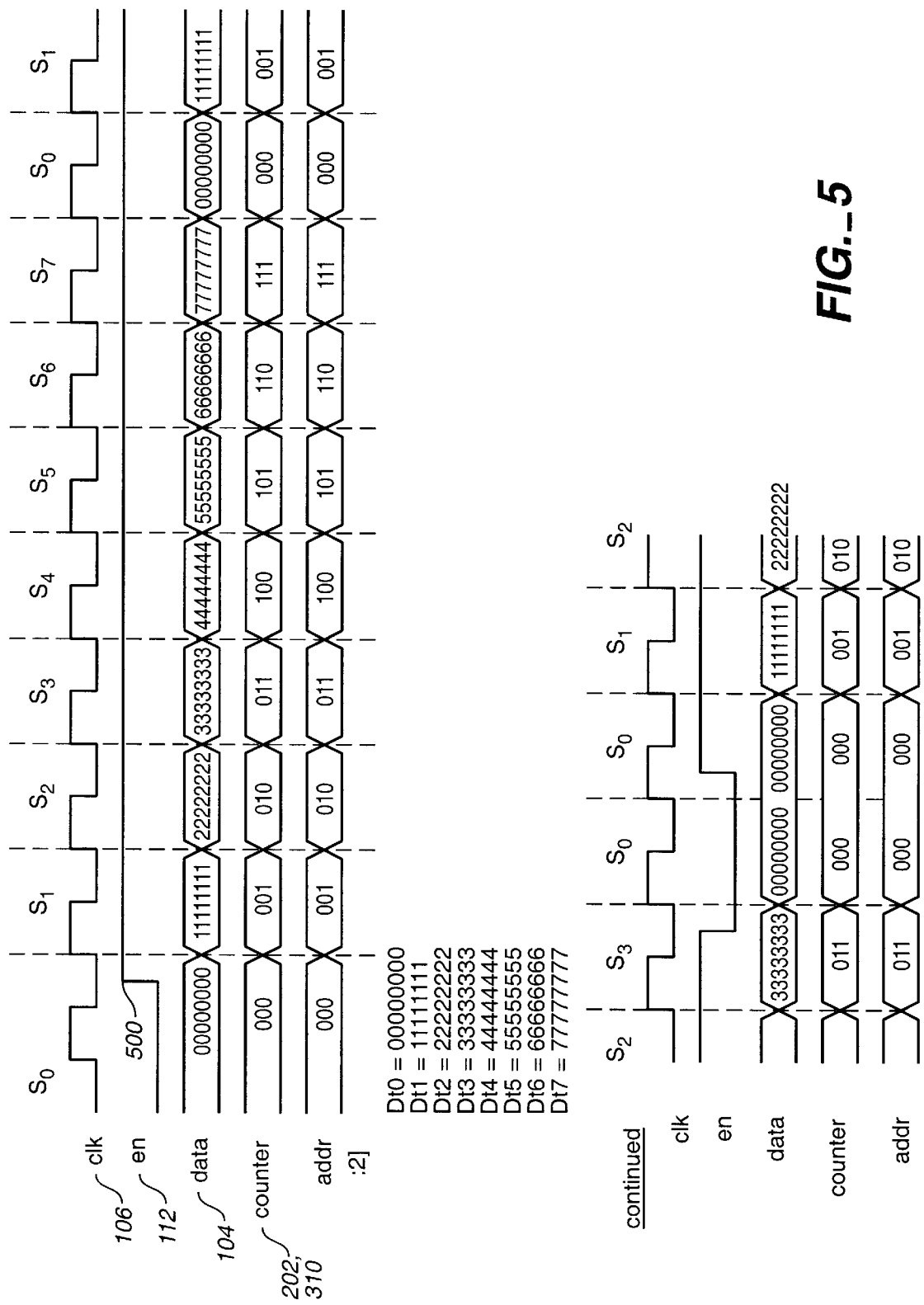
FIG._5

METHOD AND APPARATUS FOR DATA SHARING BETWEEN TWO DIFFERENT BLOCKS IN AN INTEGRATED CIRCUIT

BACKGROUND OF THE INVENTION

1. Technical Field

The present invention relates generally to digital integrated circuits. More particularly, the present invention relates to a method and apparatus for data transfer within an integrated circuit. Even more particularly the present invention relates to a method an apparatus for transferring data between two blocks within an integrated circuit using only a data bus and a common clock signal.

2. Description of the Related Art

Rapid advances in silicon chip technology have resulted from progress made in both the "front end" of the chip manufacturing line, where circuit elements are fabricated, and the "back-end-of-line", where the elements are wired into integrated circuits. The relentless drive toward increased circuit count and device speed has necessitated changes in back-end-of-line manufacturing technology. To accommodate decreasing transistor size, wiring pitch must be reduced, and to reap the benefit of increasing transistor speed, RC wiring delays must be contained. As a result, the fabrication of on-chip interconnections or "interconnects" has become difficult and costly with designers constantly striving to improve the performance of on-chip interconnections.

The speed of integrated circuits has increased so much that the propagation delay in the wires or interconnects is larger than the delay caused by a single gate. Consequently, there is a need for implementations that improve or minimize the interface between the various blocks of the integrated circuit in order to take advantage of the faster designs.

Data transfer between two blocks in an integrated circuit has typically been accomplished by sending an address from the block that needs the data to the block that contains the data. This address specifies the location of the data and is sent over an address bus that is separate from the data bus. The data is then sent by the block containing the data to the requesting block over the data bus. To indicate that the data has been sent, either a handshake signal is sent or the data is kept on the bus for a specified length of time. Obviously the address line introduces a considerable amount of wire delay into the integrated circuit. A delay is also caused by the validation of the data either through the sending of a handshake signal or holding the data on the bus for a specified length of time.

A need exists for a faster method of transferring data between two blocks in an integrated circuit. The improved method should minimize the number of interconnects or improve the performance of the interconnections in the integrated circuit so that the advantage of faster circuit elements may be realized. In addition, the improved method should minimize or eliminate the data validation that takes place using the current methods.

SUMMARY OF THE INVENTION

The present invention fulfills the need for faster data transfers by allowing for the transfer of data in an integrated circuit without the use of an address bus or the requirement of validating the data transfer using a handshake signal. A carousel register saves interface connections between blocks without impacting the number of gates and power consumption significantly. The carousel register allows two synchronous blocks using the same clock to share information without using an address bus. The block requesting data sends an enable signal to the carousel register in the block where the data is located. The enable signal serves the purposes of synchronizing the two blocks and activating the carousel register in the block where the data is contained. Data is rolled onto the bus through the use of a selector that is controlled by a counter connected to the enable signal. The requesting block then reads the appropriate data by using a counter to count the number of clocks from the time the carousel register is enabled. Upon reaching the appropriate clock cycle, the requesting block reads the data contained on the bus.

This method is obviously most useful when both of the blocks are aware of the stored order of the data and the data is not in a critical path. As an example, chips using the Open Host Controller Interface (OHCI) standard would benefit from the present invention. The OHCI specification is an industry standard whereby the operating system environment can communicate through a universal software driver instead of implementing an individualized driver for each particular piece of 1394 host silicon. Several descriptors are saved on the chip and the order is defined by the OHCI specification. Because these descriptors may be used by most blocks at any time, the descriptors are not timing critical and thus the chips are good prospects for the method of the present invention.

In an alternate embodiment, the carousel register may be implemented without the use of an enable signal by allowing the carousel register and the counter to operate at all times. Rather than use the enable signal to synchronize the two blocks, the counters in the two blocks can be synchronized with the carousel register by performing a reset in both blocks.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a block diagram of an integrated circuit that implements a preferred embodiment of the present invention;

FIG. 2 is a block diagram illustrating in further detail the Carousel Register of FIG. 1 in accordance with a preferred embodiment of the present invention;

FIG. 3 is a block diagram illustrating in further detail the method used to implement Block2 of FIG. 1 in accordance with a preferred embodiment of the present invention;

FIG. 4 is a state machine diagram illustrating the operation of the Counters in FIGS. 2 and 3 in accordance with a preferred embodiment of the present invention; and FIG. 5 is a timing diagram showing the conditions of various lines during the various states of the state diagram shown in FIG. 4 in accordance with a preferred embodiment of the present invention.

DETAILED DESCRIPTION

It is important to note that while the present invention is described in the context of an 8×1 Multiplexor and Demultiplexor, those of ordinary skill in the art will appreciate that the methods and systems of the present invention are capable of being implemented in various contexts other than a Multiplexor and Demultiplexor and that the present invention applies equally regardless of the particular device actually used to implement the invention.

Referring now to FIG. 1, a block diagram of a preferred embodiment of the claimed invention is illustrated. FIG. 1 represents functional blocks contained within an integrated circuit. In the depicted examples, the block diagram is used to illustrate how data is transferred between Block1 100 of an integrated circuit and Block2 102 of the same integrated circuit. Block1 100 and Block2 102 both contain registers for storing data. In this embodiment, Block1 100 contains data that Block2 102 needs to carry out a function. However, this does not mean that Block 2 102 could not also contain data that is needed by Block1 100, but for simplicity in explaining the invention, a one-way data transfer is illustrated. Block1 100 is connected to Block2 102 by an 8-bit data bus 104. However, one skilled in the art would recognize that the claimed invention is not limited to 8-bit data bus 104 but rather that the invention applies to any size data bus. Data bus 104 is used for transferring data from the registers in Block1 100 to the registers in Block2 102. A common clock signal 106 is connected to the clock input 108 for Block1 100 and clock input 110 for Block2 102. Common clock signal 106 is used to synchronize the data transfers as explained below. An enable line 112 from Block2 102 is connected to Block1 100 to indicate when Block2 102 needs data from Block1 100. When activated, enable line 112 generates a signal en for the indication to Block2 102. This enable line 112 is a power saving measure that provides for the placement of data on data bus 104 only when it is needed by Block2 102. If power is of no concern, then enable line 112 may be eliminated. Within Block1 100 is a Carousel Register 114 for placing data on data bus 104 when it is requested by Block2 102. Carousel Register 114 begins placing data on data bus 104 from the registers located in Block1 100 when enable line 112 is activated. The contents of the registers are sequentially placed on data bus 104 by Carousel Register 114 for the duration of a clock cycle of common clock signal 106. So long as enable line 112 is active, Carousel Register 114 will continue to place new data on data bus 104 and will start again at the first register after all of the registers have had their contents placed on data bus 104. Carousel Register 114 discontinues the placement of data on data bus 104 when the enable line 112 is deactivated by Block2 102. After enabling Carousel Register 114, Block2 102 begins counting the clock cycles from common clock signal 106 until the number of the data register from which it desires data is reached. Block2 102 is structured so that it knows the memory structure of Block1 100 and thus knows how many clock cycles it will take before the desired data is placed on data bus 104.

Referring now to FIG. 2, a more detailed block diagram of Carousel Register 114 shown in FIG. 1 is illustrated. Carousel Register 114 contains a multiplexor 200. In the depicted examples, multiplexor 200 is an 8×1 with 8-bit inputs 208a–208h and an 8-bit output. However, different types of multiplexors or mechanisms may be used depending on the number of registers and other design considerations. The control lines 204a–204c for multiplexor 200 are connected to the output of a 3-bit Counter 202. Counter 202 begins counting when enable line 112 is activated and automatically resets itself after counting up to a logical "111." Counter 202 may also be reset manually using enable line 112. While Counter 202 is counting, the count is incremented during the rising edge of each new clock cycle from common clock signal 106. Connected to the inputs 208a–208h are eight 8-bit data registers 206a–206h. The data registers 206a–206h are connected so that when a logical "000" is placed at the control lines 204a, 204b, 204c, respectively, the DtQ0 data register 206a is placed on the data bus 104 of the multiplexor 200. When Counter 202 is incremented to a logical "001" the DtQ0 data register 206b is placed on the data bus 104. Each data register is sequentially placed on data bus 104 in a similar manner until the logical "111" is reached and the DtQ7 data register is placed on the data bus 104. At that point, Counter 202 starts over again at "000" and repeats the process as long as enable line 112 is active. Even though this embodiment provides for sequential placement of the data registers on data bus 104, one skilled in the art would recognize that the data registers could be placed on the data bus 104 in a non-sequential manner.

Referring now to FIG. 3, a block diagram of a circuit contained within Block2 102 of FIG. 1 for receiving data placed on data bus 104 is illustrated in accordance with a preferred embodiment of the present invention. The 8-bit input 300 of a 1×8 demultiplexor 302 is connected to data bus 104. Depending on the value of the control lines 304a–304c, the data from the bus is placed on one of the data lines 308a–308h of the demultiplexor 302 and consequently stored in one of the corresponding data registers 306a–306h. Demultiplexor 302 is connected so that it mirrors the setup of the multiplexor 200. Counter 310, identical to Counter 202, is also used to control demultiplexor 302. To synchronize the data transfers, common clock signal 106 is connected to the clock input 110 of Counter 310 and enable line 112 is connected to both Counters 202 and 310. Counter 310 counts from 0 to 8 in binary causing data to be retrieved from data bus 104 and placed in the data registers starting with DtQ0 306a and ending with DtQ7 306h when the control lines are a logical "111." Counter 310 and Counter 202 place identical outputs on the respective control lines with each clock cycle because they are enabled at the same time and use common clock signal 106. After the desired data has been placed in one of the data registers 306a–306h, the enable line 112 is deactivated and Block2 102 may use the data as needed.

Referring now to FIG. 4, there is illustrated a state diagram for Counters 202, and 310 used to control multiplexor 200 and demultiplexor 302. The state machine begins running when enable line 112 is activated and continues to run as long as enable line 112 is active. The machine always starts in the S0 state 416, but upon activation of the enable line 112, indicated by signal en, the machine moves to the S1 state during the rising edge of the next clock cycle received from common clock signal 106. At each subsequent clock cycle, the machine moves to the next state in line as shown in FIG. 4. This process continues until enable line 112 is deactivated, as indicated by signal /en. The logic table in Table 1 below gives the values of the control inputs, represented by Add0, Add1, and Add2, during each state of Counters 202 and 310 and the corresponding active data line for each state. Because the counters and data lines in each block are mirror images, this state table applies to both Counters.

TABLE 1

|    | Add0 | Add1 | Add2 | Active Data Line |
|----|------|------|------|------------------|
| S0 | 0    | 0    | 0    | Dt0              |
| S1 | 0    | 0    | 1    | Dt1              |
| S2 | 0    | 1    | 0    | Dt2              |
| S3 | 0    | 1    | 1    | Dt3              |
| S4 | 1    | 0    | 0    | Dt4              |
| S5 | 1    | 0    | 1    | Dt5              |
| S6 | 1    | 1    | 0    | Dt6              |
| S7 | 1    | 1    | 1    | Dt7              |

A timing diagram for an embodiment of the claimed circuit is shown in FIG. 5. The first line represents common clock signal 106. The second line represents enable line 112. The third line represents the data placed on data bus 104. The fourth line represents the value of either Counter 202 or Counter 310 and the fifth line represents the value of the control lines 204a–204c, 304a–304c, which corresponds to an address for the respective data registers 206a–h, 306a–h. Note that that all of the lines except common clock signal 106 remain at the same value (S0) until enable line 112 goes active high. For purposes of this example, the data placed on the data lines 208a–208h, 308a–308h is defined for each data line and is shown in FIG. 5. Once enable line 112 is activated, the lines change at the leading edge of the next clock cycle to the values corresponding to the S1 state. Because the value on the Dt1 line is "11111111" this is the data that is placed on data bus 104 for the rest of the clock cycle. The value placed on data bus 104 for each state is shown on the data line of the timing diagram. Whenever enable line 112 goes low, the lines revert back to the S0 state. Note that Counters 202 and 320 are not required to count up to "111" but if "111" is reached and enable line 112 is still active, then the process is repeated starting with the S0 state. Sometimes it may not be necessary to count to "111." For example, if Block2 102 only needs the data from Dt3 in Block1 100, then after Counters 202 and 310 reach 011, enable line 112 is goes low and the lines revert to the S0 state as shown in FIG. 5.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention in a practical application to enable others of ordinary skill in the art to understand the invention for various embodiments with various modifications as are suited to the particular use contemplated. While the invention has been particularly shown and described with reference to a preferred embodiment, it will be understood by those skilled in the art that various changes in form and detail may be made therein without departing from the spirit and scope of the invention.

I claim:

1. An integrated circuit comprising:
  a plurality of blocks for transferring one or more data packets between the plurality of blocks;
  a bus connecting the plurality of blocks in parallel; and
  a carousel register within at least one of the plurality of blocks for sequentially placing on the bus the one or more data packets in response to a request from another at least one of the plurality of blocks.

2. The integrated circuit of claim 1, wherein the plurality of blocks are connected to a common clock for synchronizing data transfers.

3. The integrated circuit of claim 1, wherein the carousel register is activated using an enable line from one of the plurality of blocks.

4. The integrated circuit of claim 1, wherein the plurality of blocks each contain a selector for choosing the one or more data packets to be read from the bus.

5. The integrated circuit of claim 1, wherein a block within the plurality of blocks containing the carousel register includes:
  a multiplexor for sequentially placing on the bus the one or more data packets contained within each of a plurality of registers wherein a plurality of input lines, each of the plurality of input lines corresponding to one of the plurality of registers, are connected to a plurality of input terminals on the multiplexor;
  a counter connected to a select input of the multiplexor for sequentially selecting one of the plurality of registers; and
  an output from the multiplexor connected to the bus.

6. The integrated circuit of claim 5, wherein one or more of the plurality of blocks each comprise:
  (a) a demultiplexor for reading the one or more data packets from the bus and placing the one or more data packets into one of a second plurality of registers wherein a plurality of output lines from the demultiplexor are each connected to one of the second plurality of registers;
  (b) a second counter connected to the select input of the demultiplexor for sequentially selecting one of the second plurality of registers wherein a clock input of the second counter is connected to a common clock that is connected to a clock input of the first counter; and
  (c) an input to the demultiplexor connected to the bus.

7. An apparatus comprising a first circuit system adapted for connecting to a bus, the first circuit system including:
  (a) a plurality of data registers, wherein the plurality of data registers hold data;
  (b) a multiplexor, wherein the Multiplexor has a plurality of inputs connected to the plurality of data registers and an output connected to the bus
  (c) an input line adapted to receive requests from a second circuit system;
  (d) a selection unit connected to the multiplexor and input line, wherein the selection unit controls the multiplexor and wherein in response to the input line receiving a request, the selection unit selects each of the plurality of data registers for output onto the bus.

8. The apparatus of claim 7, further comprising a second circuit system, wherein the second circuit system includes:
  (a) a demultiplexor;
  (b) a plurality of data registers connected to the demultiplexor; and
  (c) a selection unit, wherein the selection unit selects each of the plurality of data registers to store data received from the bus.

9. The apparatus of claim 8, wherein the selection unit in the first circuit system and the selection unit in the second circuit system each having an input for a clock signal selection of data registers are synchronized by the clock signal.

10. The apparatus of claim 7, wherein the selection unit sequentially selects each of the plurality of data registers for output onto the bus.

11. The apparatus of claim 8, wherein the selection unit in the second circuit system sequentially selects each of the plurality of data registers to store data received from the bus.

12. The apparatus of claim 11, wherein the selection unit in the first circuit system sequentially selects each of the plurality of data registers for output onto the bus.

13. A method of transferring information between a plurality of blocks comprising the steps of:
sending a request from a second block of the plurality of blocks to a first block of the plurality of blocks;
in response to the request, placing on a bus that connects the plurality of blocks in parallel individual data contained in at lest a portion of a plurality of registers stored in the first block of the plurality of blocks;
retrieving the data from the bus; and
storing the data in the second block of the plurality of blocks.

14. The method of claim 13, wherein the step of placing on a bus individual data contained in at least a portion of a plurality of registers located in a first block of the plurality of blocks further comprises the steps of:
selecting the data contained in at least a portion of a plurality of registers located in a first block of the plurality of blocks using a selector contained within the first block of the plurality of blocks;
placing the selected data on the bus for the duration of a clock cycle; and
repeating the steps of selecting the data contained in at least a portion of a plurality of registers stored in a first block of the plurality of blocks and placing the selected data on the bus for the duration of a clock cycle until the data to be retrieved from the bus has been placed on the bus.

15. The method of claim 14, wherein the step of selecting the data located in at least a portion of a plurality of registers located in a first block of the plurality of blocks is accomplished using a counter activated by a clock wherein each count of the counter corresponds to one of the plurality of registers.

16. The method of claim 13, wherein the step of placing on a bus the data stored in the first block of the plurality of blocks is begun when an enable signal is received by the first block from one of the plurality of blocks.

17. The method of claim 13, wherein the step of selecting data to be retrieved from the bus further comprises the steps of:
determining one of the plurality of registers in the first block of the plurality of blocks from which data is desired;
counting clock cycles starting with a cycle in which data from a first register of the plurality of registers is placed on the bus; and
placing the data from the bus into one of a second plurality of registers corresponding to the one of the plurality of registers from which the data was placed on the bus as determined by the number of clock cycles counted.

18. An apparatus comprising:
a first circuit system and a second circuit system wherein both the first circuit system and the second circuit system are connected to a bus;
a first plurality of data registers within the first circuit system, wherein each of the first plurality of data registers hold data;
a second plurality of data registers within the second circuit system, wherein each of the second plurality of data registers hold data;
a multiplexor, wherein the multiplexor has a plurality of inputs connected to the first plurality of data registers and an output connected to the bus;
a first selection unit connected to the multiplexor, wherein the first selection unit controls the multiplexor and selects each of the first plurality of data registers for output onto the bus;
a demultiplexor, wherein the demultiplexor has an input connected to the bus and a plurality of outputs connected to the second plurality of data registers; and
a second selection unit connected to the demultiplexor, wherein the second selection unit controls the demultiplexor and selects each of the plurality of data registers to store data received from the bus.

19. The apparatus of claim 18 further comprising an enable line controlled by the second circuit system and connected to the first selection unit.

20. The apparatus of claim 19, wherein there are one or more modes of operation wherein in a first mode of operation the enable line is activated by the second circuit system when the second circuit system needs data from the first circuit system.

21. The apparatus of claim 20, wherein in a second mode of operation the enable line remains activated during the operation of the first circuit system allowing for continuous operation of the first selection unit.

* * * * *